(12) United States Patent
Sharma

(10) Patent No.: US 8,893,271 B1
(45) Date of Patent: Nov. 18, 2014

(54) END NODE DISCOVERY AND TRACKING IN LAYER-2 OF AN INTERNET PROTOCOL VERSION 6 NETWORK

(75) Inventor: Govind Prasad Sharma, Union City, CA (US)

(73) Assignee: Cisco Technology, Inc., San Jose, CA (US)

( * ) Notice: Subject to any disclaimer, the term of this patent is extended or adjusted under 35 U.S.C. 154(b) by 113 days.

(21) Appl. No.: 13/570,586

(22) Filed: Aug. 9, 2012

(51) Int. Cl.
*G06F 11/00* (2006.01)
*G06F 21/78* (2013.01)
*H04L 29/06* (2006.01)

(52) U.S. Cl.
CPC ............. *G06F 21/78* (2013.01); *H04L 63/0236* (2013.01)
USPC .......................................................... 726/22

(58) Field of Classification Search
CPC .. G06F 21/78; H04L 63/0236; H04L 63/0869
USPC ............................................................ 726/22
See application file for complete search history.

(56) References Cited

U.S. PATENT DOCUMENTS

| 5,379,402 | A | * | 1/1995 | Fujihara et al. | ............... 711/141 |
| 6,119,150 | A | * | 9/2000 | Fujii et al. | ..................... 709/213 |
| 8,107,396 | B1 | | 1/2012 | Sharma | |
| 8,625,603 | B1 | * | 1/2014 | Ramakrishnan et al. | .. 370/395.3 |
| 2007/0274232 | A1 | * | 11/2007 | Axelsson et al. | ............. 370/254 |

* cited by examiner

*Primary Examiner* — Mohammad W Reza
(74) *Attorney, Agent, or Firm* — Edell, Shapiro & Finnan, LLC

(57) ABSTRACT

Network security and tracking techniques are provided for intercepting at a first hop switch a neighbor discovery protocol (NDP) message sent from an end node of an Internet Protocol Version 6 (IPV6) network. Address information contained in the NDP message are compared to values stored in a local device tracking cache. As a result of the comparing, end node discovery and learning are performed.

32 Claims, 7 Drawing Sheets

END NODE DISCOVERY AND TRACKING IN LAYER-2 OF AN INTERNET PROTOCOL VERSION 6 NETWORK

TECHNICAL FIELD

The present disclosure relates generally to computer networks, and more particularly, to computer network security.

BACKGROUND

Internet Protocol version 6 (IPv6) networks share the same underlying layer-2 physical network infrastructure among different users to transport IPv6 traffic. With growing user mobility, virtualization and wireless access technologies, enterprise networks are transporting traffic from more heterogeneous users than ever before. In private cloud and traditional data center deployments, the physical network is typically shared between different employees, contractors, partners and guest users of the same organizations. In public cloud deployments, the network is shared among users from different organizations or tenants.

Due to this shared nature of the underlying layer-2 network, the user traffic is vulnerable to threats by rogue users, hosts, routers or servers that gain unauthorized access. Once connected, the rogue user can sniff control and/or data packets from the authorized hosts, steal their identity and carry out different forms of attacks. Rogue users can unleash man-in-the-middle attacks, denial-of-service (DoS) attacks, and replay attacks on the authorized hosts in the network.

IPv6 end hosts use the Neighbor Discovery Protocol (NDP) to exchange information with neighbors (other hosts or the routers) on the same link to prepare to transmit and receive network traffic. The key functions achieved by the ND Protocol are Router Discovery, Address Auto-configuration, Duplicate Address Discovery, Address Resolution, and Unreachability Detection.

The above NDP exchanges are vulnerable to security threats. A rogue host can sniff the NDP exchanges between the legitimate end hosts and the routers on the link, silently listen to communications, steal identities and carry out various attacks.

DESCRIPTION OF EXAMPLE EMBODIMENTS

Overview

According to one aspect of the techniques described herein, a first hop switch intercepts a neighbor discovery protocol (NDP) message sent from an end node of an Internet Protocol version 6 (IPv6) network. Address information contained in the NDP message is compared to values stored in a local device tracking cache. Based upon the comparing, end node discovery and learning are performed.

Example Embodiments

Figure 1:
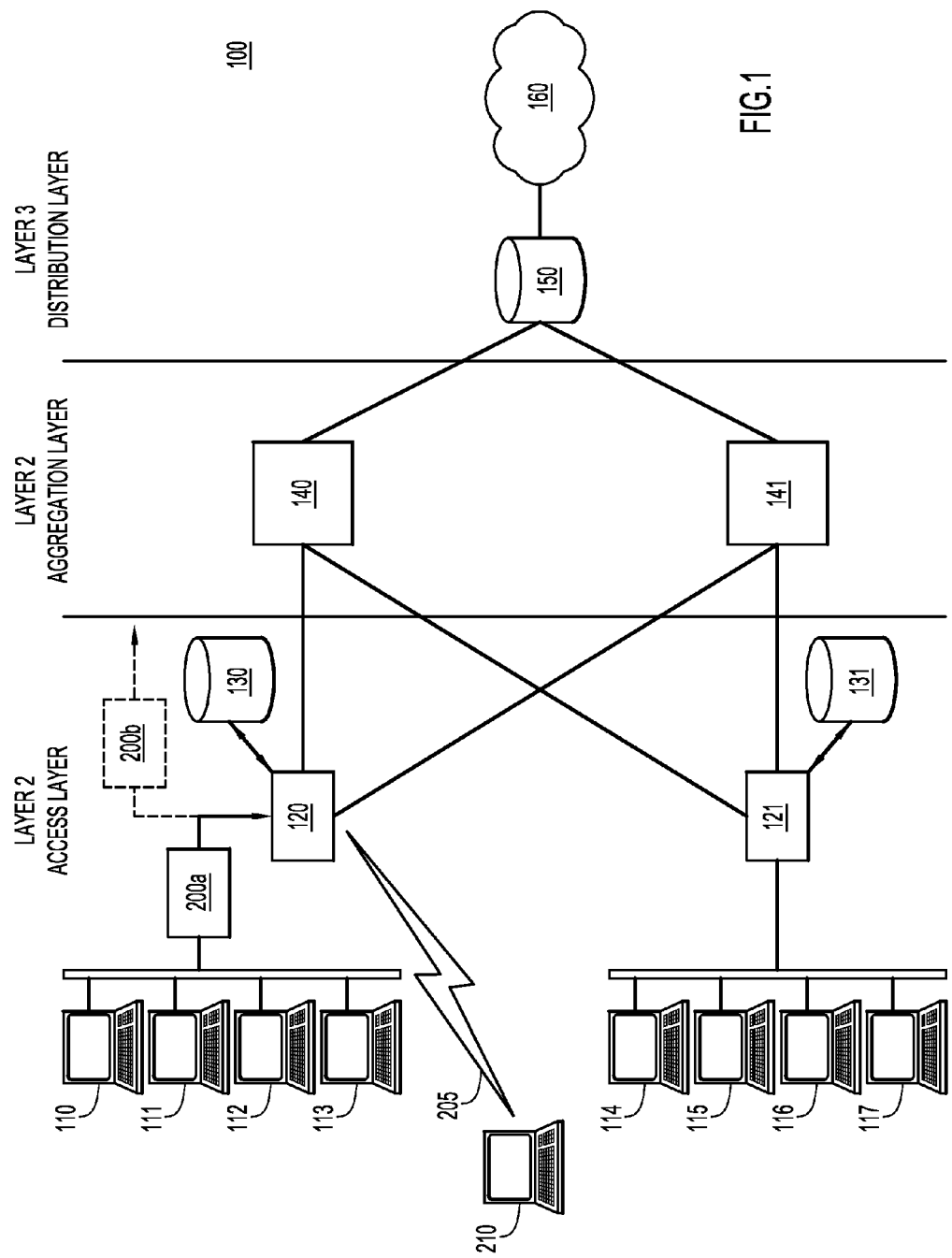
FIG. 1 illustrates an example computer network in which a first hop switch is configured for end node discovery.

FIG. 1 shows an example computer network 100 for performing end node discovery and tracking. According to example embodiments, computer network 100 may be configured according to the IPv6 standard. End nodes (or hosts) 110-117 are connected to network 100 through first hop switches 120 and 121. Specifically, end nodes 110-113 are connected to first hop switch 120, while end nodes 114-117 are connected to first hop switch 121. First hop switch 120 contains local device tracking cache 130. Similarly, first hop switch 121 contains local device tracking cache 131. First hop switch 120 is connected to switch 140, and first hop switch 121 is connected to switch 141. Both switches 140 and 141 are, in turn, connected to router 150. Router 150 is connected to the Internet 160.

As depicted in FIG. 1, first hop switches 120 and 121 serve as switches at a Layer-2 (L2) access layer. As is known in the art, the L2 is a data link layer of the Open Systems Interconnection (OSI) model. Switches 140 and 141 serve as switches at an L2 aggregation layer L2 because they aggregate traffic from multiple switches at the L2 access layer. According to this example, the first hop switches 120, 121 are located at the edge of the L2, OSI model. According to other examples, a single layer of switches may be present which serves both or either of the access layer and aggregation layer functions.

While FIG. 1 depicts each of the end nodes 110-117 as attached to a single first hop switch 120 or switch 121, other examples may include redundant systems in which each end node 110-117 is attached to multiple first hop switches.

According to the example of the configuration in FIG. 1, router 150 serves at a distribution layer according to the OSI model. Of course, other examples may contain additional routers connected to additional switches and end nodes.

In the example of FIG. 1, the first hop switch 120 discovers end nodes 110-113. An end node initiates an NDP exchange to discover information about other nodes within network 100 in order to prepare for future transmissions across network 100. NDP messages are packetized according to the Internet Control Message Protocol version 6 (ICMPv6). The NDP exchanges may be used to negotiate an Internet Protocol (IP) address auto-configuration mechanism, verify the uniqueness of previously configured addresses, resolve IP address to Link Layer Address (LLA) or media access control (MAC) address binding, as well as other functions. In order to perform these functions, NDP exchanges are made between end nodes 110-113 and router 150, with first hop switch 120 and switch 140 simply bridging the messages between the end nodes 110-113 and router 150 according to destination MAC addresses in the Ethernet header of NDP messages.

According to the techniques described herein, first hop switch 120 may take an active role in applying security to the network 100 by discovering and verifying the identities of end nodes 110-113 and dropping messages 205 sent by possibly malicious entities, such as attacker 210.

As depicted in FIG. 1, an NDP message 200a sent by one of end nodes 110-113 as part of an NDP exchange is intercepted (or snooped) by first hop switch 120. The NDP message 200a may be a packetized neighbor discover message according to the ICMPv6 standard. The NDP messages that may be intercepted by the first hop switch 120 may include Neighbor Solicitation (NS) messages, Neighbor Advertisement (NA) messages, Router Solicitation (RS) messages, Router Advertisement (RA) messages, and Redirect NDP messages.

First hop switch 120 may then compare information contained in the intercepted NDP message, such as address information, with values stored in local device tracking cache 130. Based on the comparison, the first hop switch 120 will perform end node discovery and learning operations, e.g., create a new entry in the local device tracking cache and/or inspect the contents of the neighbor discover message.

For example, if the comparison of the information contained in the intercepted NDP message 200a with the values stored in local device tracking cache 130 indicates that the NDP message 200a was sent by a previously unknown/undiscovered one of the end nodes 110-113, the first hop switch 120 may create a new entry in the local device tracking cache 130, thereby storing values associated with the previously undiscovered one of the unknown nodes 110-113. The new entry in the local device tracking cache 130 will form an association or binding of the LLA and IPv6 addresses of the end nodes 110-113 at the first hop switch 120. This will allow the first hop network switch 120 to subsequently track the connectivity status and verify the identity of the end nodes during their lifetime in an L2 Ethernet network. As will be explained further hereinafter, the creation and deletion of LLA and IPv6 address bindings can be used to dynamically grant and revoke network access policies and mitigate spoofing and man-in-middle attacks by rogue devices.

Alternatively, first hop switch 120 may determine, based on the comparison with the values stored in the local device tracking cache 130, that an entry corresponding to one of the end nodes 110-113 already exists, and the intercepted NDP message 200a will need to undergo further inspection. The further inspection may result in the first hop switch 120 forwarding the NDP message as shown at reference numeral 200b to router 150. The further inspection may also cause the first hop switch 120 to drop or block the NDP message 200a to prevent it from communicating with other network nodes. For example, NDP message 200a may be dropped or blocked if the inspection results in a determination that the NDP message 200a came from an attacker 210.

Figure 2:
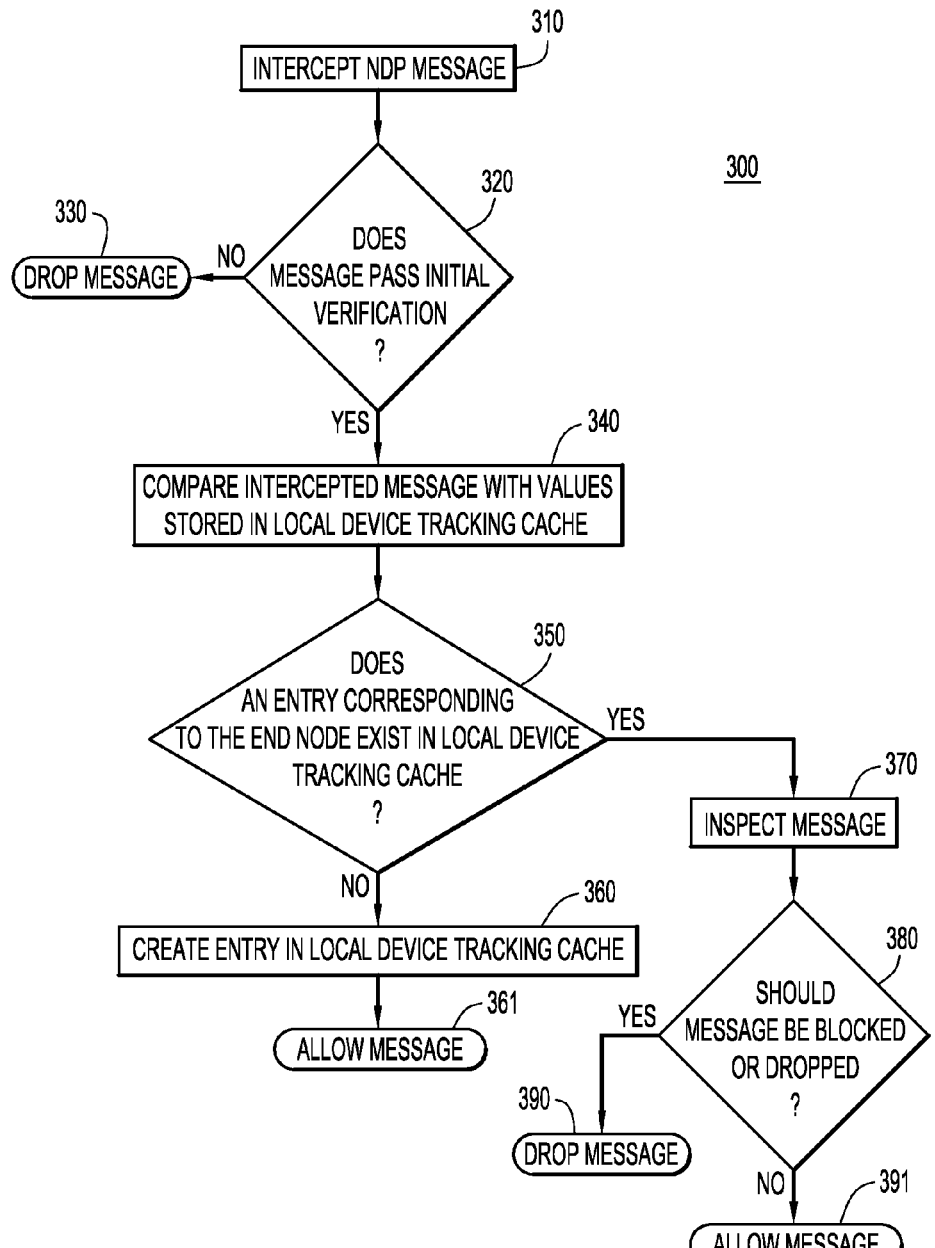
FIG. 2 is a flow chart illustrating an example method for performing end node discovery.

Referring now to FIG. 2, in conjunction with FIG. 1, flowchart for a process 300 is now described. Process 300 begins in step 310 where an NDP message is intercepted. The NDP message may be intercepted at first hop switch 120, or at other switches or nodes according to other examples. In step 320 an initial verification or consistency check is performed on the intercepted message. For example, the sender link layer address (SLLA) of the NDP message may be compared with the sender MAC (SMAC) field of the Ethernet header of the message. A mismatch in these two addresses may result in the message being dropped as indicated in step 330. Additional fields that may be read from the intercepted message may include the OSI Level 3 (L3) address or IPv6 address of the sender end node, which may be read from the Source Address field of the IPv6 header. If the IPv6 source address is unspecified, the IPv6 address may also be read from the Target Address of the NDP options field. Additionally, the end node type of the sender end node, the physical or connected port of the sender end node, the virtual local area network (VLAN) ID of the sender end node or the VLAN ID of the physical port to which the sender node is connected may also be read from the intercepted NDP message.

At step 340, information from the intercepted NDP message is compared with information contained within the local device tracking cache 130. For example, the VLAN ID and/or the SLLA contained within the intercepted discovery message can be compared with data contained within the local device tracking cache 130. As a result of the comparison, it is determined in step 350 whether an entry exists in the device tracking cache that corresponds to the end node. According to a specific example, it may be determined that the local device tracking cache 130 contains an entry with the same VLAN ID and/or SLLA as contained in the intercepted NDP message. When such an entry is present in the local device tracking cache 130, the end node which sent the NDP message has already been discovered, and is being tracked by first hop switch 120. Alternatively, if there is no matching entry in the local device tracking cache 130, according to step 360, a new entry will be created in the local device tracking cache 130. Once a new entry is created in the local device tracking cache 130, network access may be opened for the end node with appropriate privileges.

If it is determined that an entry already exists in the local device tracking cache 130 for the end node, further inspection is performed on the message in step 370. According to one example, information from the intercepted message may be compared with values stored in the local device tracking cache 130. For example, the sender IPv6 address and SLLA from the intercepted message are compared with IPv6 address and LLA values for the end node stored in the local device tracking cache 130. If there is a mismatch between the received values and the stored values, the message may be dropped. By comparing the sender IPv6 address and SLLA with stored IPv6 address and LLA values it is possible in step 380 to decide to block or drop address spoofing attacks carried out by rogue users who try to spoof the addresses of legitimate end nodes by sending fake NDP messages, for example fake Neighbor Advertisement and Router Advertisement messages associated with DoS attacks, or to steal identity information.

Additional security may be provided by comparing other received fields with the fields stored in the local device tracking cache 130. For example, the physical port of the intercepted message can be compared with a physical port for the end node stored in the local device tracking cache 130. Alternatively, the VLAN of the intercepted message can be compared with a VLAN stored in the local device tracking cache 130. Furthermore, combinations of the SLLA, IPv6 address, port and VLAN can be compared with values stored in the local device tracking cache 130.

According to other examples, step 370 may examine the intercepted message to determine if the NDP message is of a type that is prohibited for the end node that sent the message. For example, if end nodes 110-113 are end points connected to host facing ports, the end nodes should be blocked from sending Router Advertisement NDP messages. Accordingly, if it is determined in step 370 that the sending end node is an end node connected to a host facing port, and the NDP message is a Router Advertisement message, the decision made at step 380 may be to drop or block the message at step 390.

Still other applications may involve limiting broadcast, multicast, and unknown unicast NDP messages from end points to the trusted ports on a switch. For example, broadcast and multicast RS and NS messages would only be sent to the ports facing routers, and not to the ports facing hosts. Accordingly, if the inspection at step 370 determines that the message is an RS or NS message, it will be determined in step 380 that any messages originally sent to a host facing port should be dropped or blocked at step 390.

If it is determined that the message should not be blocked, the message is forwarded to its destination node in step 391. Alternatively, the forwarding may also include limited forwarding to specific nodes. For example, a broadcast message may be partially blocked to specific nodes, and partially forwarded to other allowed nodes.

Figure 3:
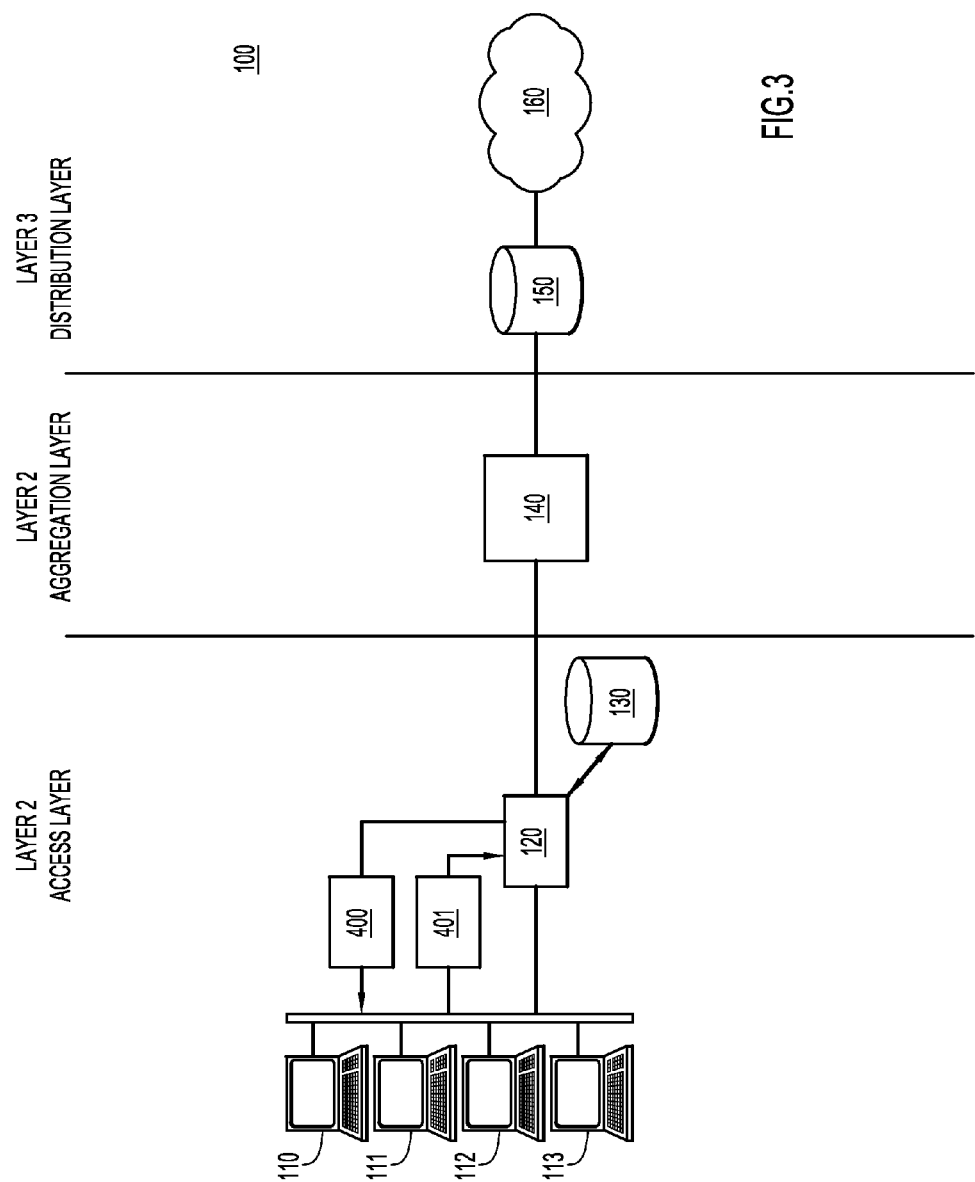
FIG. 3 illustrates end node tracking at a first hop switch.

Turning now to FIG. 3, a diagram is shown similar to FIG. 1, but in this case, messages are used to perform device tracking. Once an end node is discovered, the local device tracking cache 130 may be kept current. When end nodes cease to be connected to IPv6 network 100, local device tracking cache 130 should be updated, and the end node privileges should be revoked to prevent any unauthorized use of the privileges by rogue users. Updating the local device tracking cache 130 may be accomplished by monitoring the connectivity status of the trusted end nodes in the network from the first hop switch. In order to monitor an end node, the first hop switch 120 sends an NDP message 400 to one of end nodes 110-113 which has a corresponding entry in local device tracking cache 130.

For example, the NDP message 400 may be an NS message, and more specifically, a unicast NS message. The NS message may be chosen because it is the NDP message with the smallest "footprint" and will consume the least network resources. Additionally, the NS message can be sent without including any optional fields, further reducing its "footprint."

An NS message is normally sent by a new node to ensure that there are no other nodes within the IPv6 network with the same address. Accordingly, the NS message is normally broadcast or multicast throughout the IPv6 network 100. If an existing node with the same address as the address indicated the broadcasted NS message receives the NS message, the existing node will immediately send an NA reply to the new end node indicating that the address is already in use.

The unicast NS message 400 may be sent to a specific one of the end nodes 110-113 that the first hop switch 120 is tracking. Because the local device tracking cache 130 may record the address for each of the end nodes 110-113, the NS message 400 may be sent with the address of the end node that the first hop switch 120 is tracking.

When the NS message 400 is received by one of the end nodes 110-113 to which it is sent, that end node will interpret the message as a new end node seeking to use its address. That end node will respond by sending an NDP message 401 which, according to one example, may be an NA message.

When the first hop switch 120 receives the response NDP message 401, it will understand that the end node which sent the NDP message 401 is still connected to the IPv6 network 100. Accordingly, the first hop switch 120 will maintain the entry corresponding to the end node that sent the NDP message 401 in the local tracking cache 130, and will continue to allow that end node access to IPV6 network 100.

Alternatively, if the first hop switch 120 does not receive a response NDP message 401 from the one of the end nodes 110-113, the first hop switch 120 may conclude that the particular end node to which NDP message 400 was sent is no longer connected to the IPv6 network 100. Accordingly, the first hop switch 120 may delete the entry in the local device tracking cache 130 for that end node, and the first hop switch may revoke network access privileges for any device with the address previously associated with that end node.

Figure 4:
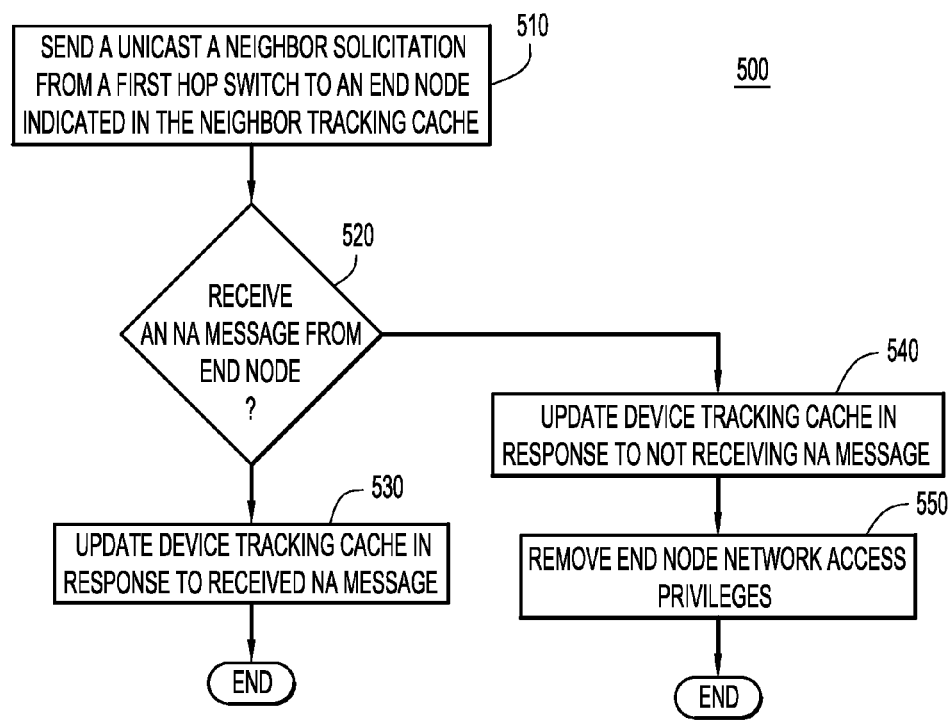
FIG. 4 is a flow chart illustrating an example method of performing end node tracking.

With reference to FIG. 4, a flowchart will now be described for process 500 for tracking end nodes, as generally explained above in connection with FIG. 3 t. In step 510 a unicast NS message 400 is sent from a first hop switch 120 to a particular end node indicated in the local device tracking cache 130. As discussed above, the NS message 400 may include the address of the end node as recorded in an entry in the local device tracking cache 130.

At step 520, it is determined whether or not an NA message has been received from that end node in response to the NS message 400. It should be understood that step 520 may involve waiting a sufficient amount of time.

If an NA response message is received, the first hop switch 120 refreshes the entry in the local device tracking cache 130 corresponding to that particular end node in step 530. If, instead, no NA response is received, the first hop switch will update the local device tracking cache 130 to indicate that no NA message was received in step 540. The updating of the device tracking cache may include deleting the entry in the local device tracking cache 130 for that particular end node, and the network privileges of that particular end node may be removed in step 550. While steps 540 and 550 are shown as two discrete steps, it should be understood that updating the local device tracking cache 130, deleting the local device tracking cache entry and the removing the end node network access privileges may be accomplished in more or fewer steps.

According to another example, the first hop switch 120 may not delete the entry in the local device tracking cache 130 until a predetermined number of NS messages 400 have been sent without receiving an NA response 401. According to this example, the first hop switch 120 may update the local device tracking cache 130 to indicate that no NA message 401 was received, as well as updating the entry to indicate the number of NS messages 400 that have been sent without having received an NA message 401 in response. Once the number of NS messages 400 without receiving an NA message 401 in response equals or exceeds a predetermined number, the local device tracking cache 130 may delete the entry in the local device tracking cache for that particular end node as discussed above for step 540, and the network privileges of the particular end node may be removed as discussed for step 550.

Figure 5:
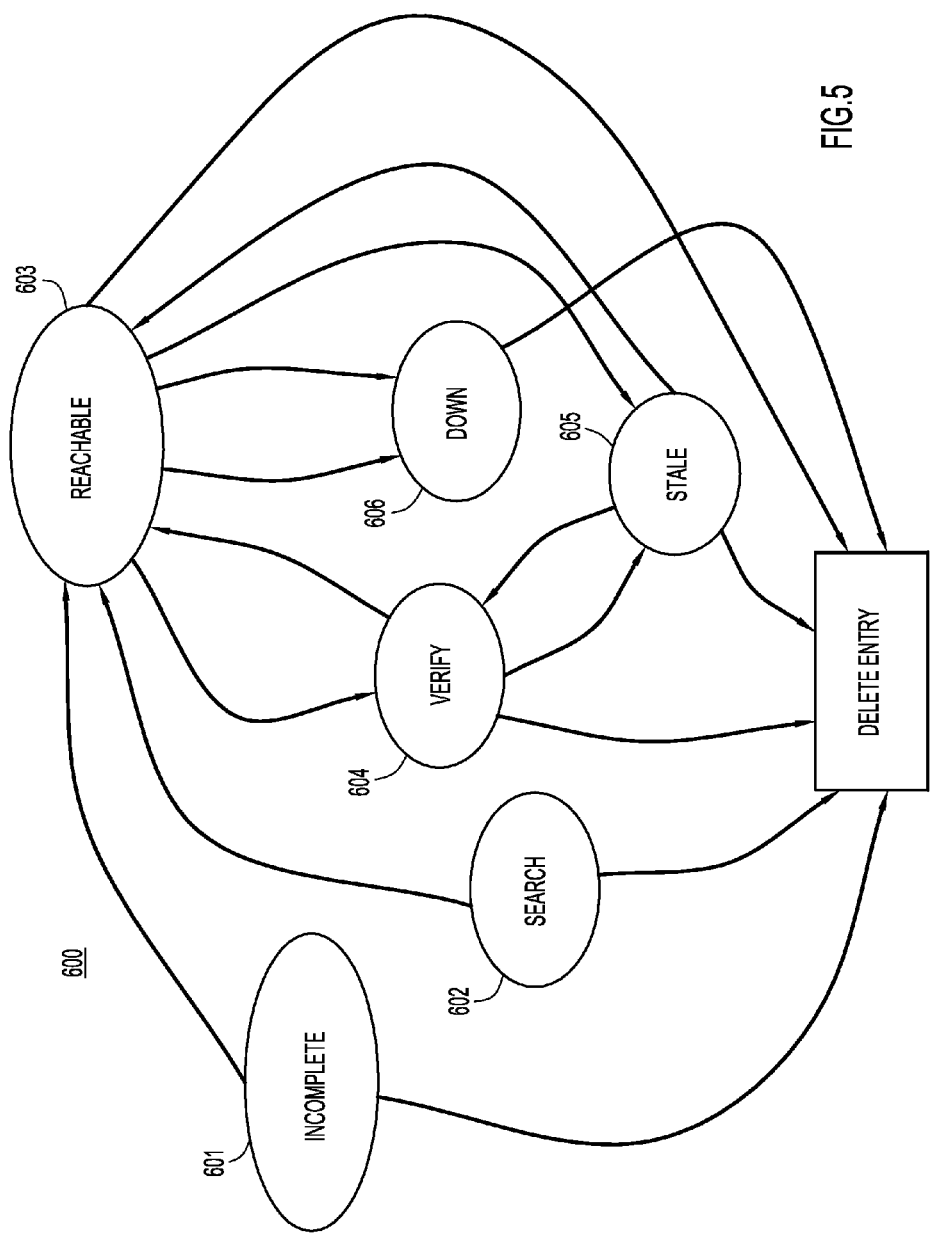
FIG. 5 illustrates an example finite state machine for end node discovery and tracking.

Reference is now made to FIG. 5. FIG. 5 illustrates a representation of a finite state machine for the possible lifecycles for entries in the local device tracking cache 130. In addition to address and identification information, the local device tracking cache 130 may also indicate one of a plurality of states 601-606 for a cache entry. The states are INCOMPLETE 601, SEARCH 602, REACHABLE 603, VERIFY 604, STALE 605 and DOWN 606. An entry will be created with a state of INCOMPLETE 601. The state INCOMPLETE 601 can change to REACHABLE 603 when its binding becomes known, and can move back and forth from REACHABLE 603 to VERIFY 604 if tracking is enabled. The state can change to STALE 605 if the device stops talking on the IPv6 network 100, and at which point it is deleted from the local device tracking cache 130.

An entry may be set to INCOMPLETE 601 when it does not have a complete local device tracking cache entry yet. This may happen when an end node sends a new NS message that may not contain all of the necessary information for a full entry in the local device tracking cache 130, for example an SLLA. Creating an entry in the INCOMPLETE state 601 may result in the first hop switch 120 unicasting an NS message to the end node in order to acquire all of the necessary information. An entry will remain in the INCOMPLETE state 601 until a response is received from the end node containing the missing information. Alternatively, if too much time passes by or too many attempts are made without receiving the missing information, the entry will be deleted.

An alternative to the INCOMPLETE state 601 is SEARCH state 602. An entry is set to SEARCH 602 when an entry is created, but the first hop switch 120 has not received sufficient information to create a complete entry nor has it received sufficient information to send a unicast message to retrieve the missing information. For example, if the intercepted messages contain neither an SLLA nor an SMAC, the first hop switch will not be able to send a unicast message to the end node. Accordingly, the first hop switch will send a multicast message, such as a multicast NS message, in order to retrieve the missing information. An entry will remain in the SEARCH state 602 until a response is received from the end node containing the missing information. Alternatively, if too much time passes by or too many attempts are made without receiving the missing information, the entry will be deleted.

An entry may be set to REACHABLE 603 when a complete entry in the local device tracking cache 130 is created for an end node. Additionally, a timer may be provided which indicates when the end node corresponding to the entry should be tracked according to techniques described above in connection with FIGS. 3 and 4.

Upon expiration of the timer, the entry state may be moved to VERIFY 604. When an entry state is changed to VERIFY 604, the tracking procedures according to the FIGS. 3 and 4 may commence. If the first hop switch receives an NA response message from the end node, the first hop switch 120 may update the local device tracking cache 130 to change the state back to REACHABLE 603 and reset the timer. Alternatively, if no NA response message 401 is received, the first hop switch 120 may update the local device tracking cache 130 to change the state to STALE 605 before deleting the entry.

The state of an entry in the local device tracking cache 130 may also be changed to STALE 605 when a predetermined number of NS messages 400 are sent without receiving an NA message 401 in response. Between the time the first NS message 400 is sent without a response and the predetermined number of NS messages 400 have been sent, the state entry in the local device tracking cache 130 may be changed to STALE 605.

Finally, an entry may be set to DOWN 606 when the interface from which the entry was learned ceases to be active or connected to the network preventing any verification or tracking. The entry will remain in a DOWN state 606 until a certain amount of time passes and the entry is deleted, or until the interface once again becomes active.

Figure 6:
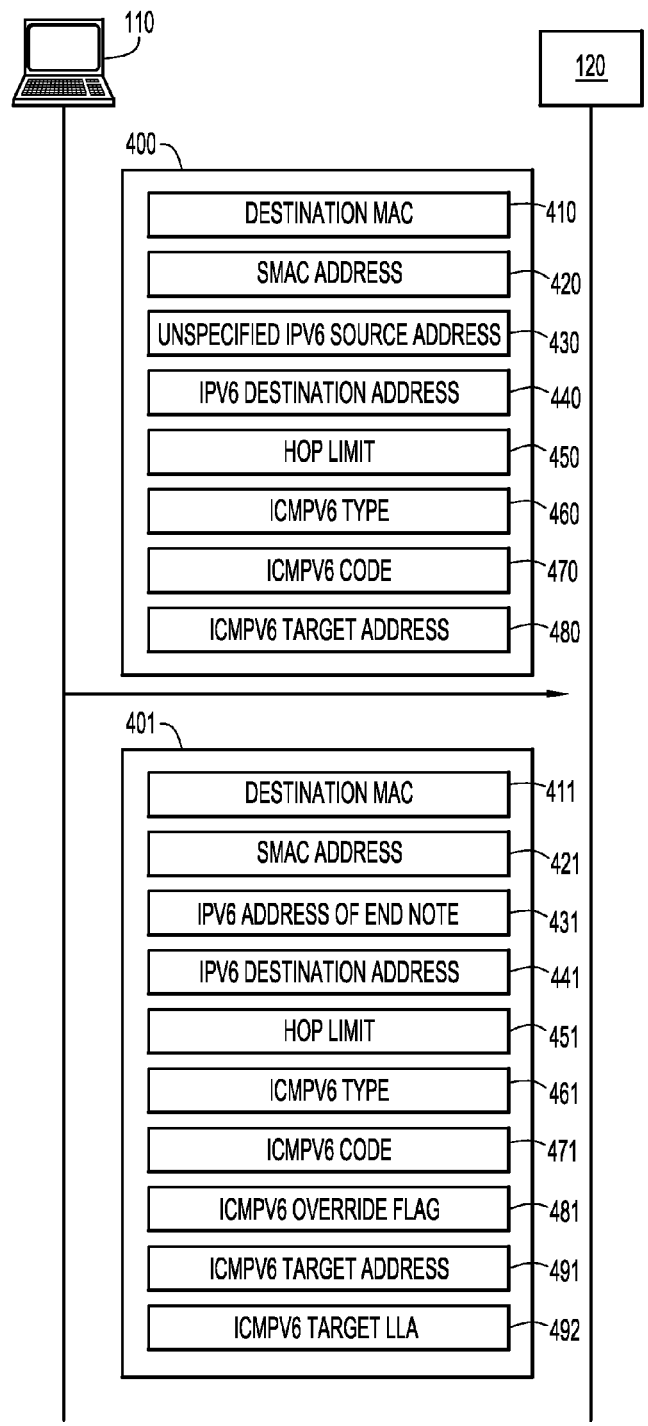
FIG. 6 is a ladder diagram that illustrates an exchange of messages for performing end node tracking.

Turning now to FIG. 6, the fields are shown of the NS message 400 sent by switch 120 to end node 110 and of the NA message 401 sent by end node 110. According to the example, field 410 comprises the destination MAC or LLA address of an Ethernet header and is populated with the end node address retrieved from the local device tracking cache 130. As indicated above, NS message 400 is a unicast message. Accordingly, the Destination MAC or LLA address 410 is populated with the end node address and not a broadcast or multicast address. Field 420 comprises the SMAC or SLLA address of an Ethernet header. Field 430 is a source address of an IPv6 header, which is populated with an unspecified address, such as a string of zeros. Field 440 is the IPv6 destination address field. Field 450 is the hop limit for the NS message. Field 460 comprises the type field of an ICMPv6 header indicating the message 400 is an NS message. Field 470 is ICMPv6 code field. Because message 400 is a neighbor solicitation message, field 460 will be populated with a value of "135" and field 470 will be populated with a value of "0." Field 480 is the target address of an ICMPv6 header and is populated with the IPv6 address of end node 110 retrieved from the local device tracking cache 130 and to which the NS message 400 is targeted. To decrease the "footprint" of the NS message and use fewer network resources, the "Option" field of the ICMPv6 header may be set to NULL.

Since the message 400 is an NS message according to the neighbor discovery protocol, when the end node 110 receives the NS message 400, the end node 110 believes that another network device is attempting to use the same IPv6 address already assigned to and used by end node 110. Specifically, in an NS message, field 480 indicates the address that a new device is intending to use. Because field 480 has been populated with the IPv6 address already assigned to end node 110, end node 110 will respond with an NA message to notify to the rest of the network devices that the IPv6 address contained in field 480 is already in use by end node 110.

Accordingly, the end node will prepare and send an NA response message 401. According to FIG. 6, field 411 comprises the destination MAC or LLA address of an Ethernet header populated with an all-node multicast address. Field 421 comprises the sender MAC address or LLA of an Ethernet header populated with the MAC or LLA address of end node 110. Field 431 comprises the source address of an IPv6 packet populated with the IPv6 address of end node. Field 441 comprises the destination address of an IPv6 header and is populated with an all-node multicast IPv6 address. Field 451 is the hop limit for the NA message. Field 461 comprises the type field of an ICMPv6 header indicating that message 401 is an NA message, while field 471 is the ICMP code field. Because the message 401 is an NA message, field 451 is populated with "136" while field 471 is populated with "0." Field 481 is ICMP override field, which may indicate whether or not the message should override a previously entered cache entry. The NA response message may also include the ICMPv6 Target address 491 which is populated with the end node IPv6 address. Field 492 comprises the ICMPv6 LLA which is populated with the end node MAC address.

Upon receiving message 401 from end node 110, the first hop switch 120 updates the local device tracking cache 130 as described above with reference to FIGS. 3 and 4. Additionally, because first hop switch 120 understands that message 401 is the NA response message sent in response to NS message 400, the first hop switch may not forward message 401 to all other nodes of IPv6 network 100 even though the fields 411 and 441 indicate that message 401 is a multicast message.

Figure 7:
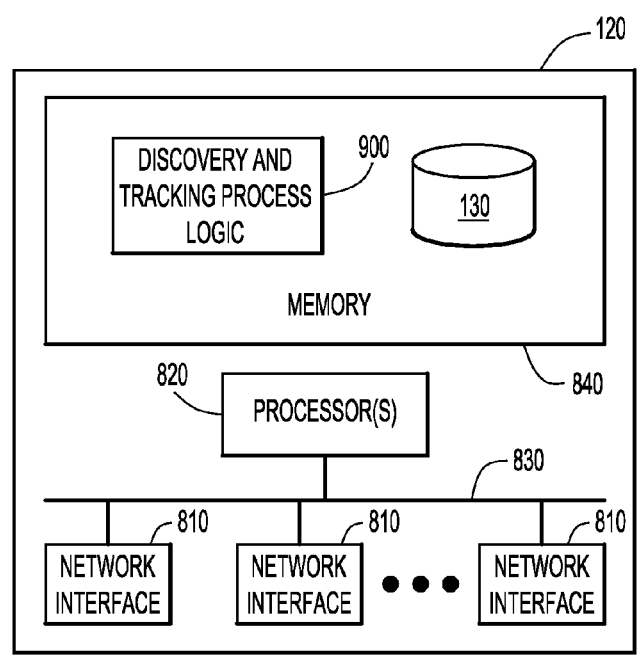
FIG. 7 is an example block diagram of a switch configured for end node discovery and tracking according to the techniques described herein.

Referring now to FIG. 7, an example block diagram is shown of first hop switch 120 configured to perform the techniques described herein. First hop switch 120 comprises network interfaces 810 having ports facing in a direction of end nodes and also ports facing in a direction of an aggregation switch. A processor 820 is provided to coordinate all controls and functions of the switch 120. The processor 820 is, for example, a microprocessor or microcontroller, and it communicates with the network interface 810 via bus 830. Memory 840 comprises software instructions which may be executed by the processor 820. For example, software instructions for discovery and tracking process logic 900 are stored in the memory. The process logic 900 includes instructions that enable the switch 120 to carry out the operations described above in connection with FIGS. 1-6. Additionally, the local device tracking cache 130 may contained within memory 840.

Memory 840 may comprise read only memory (ROM), random access memory (RAM), magnetic disk storage media devices, optical storage media devices, flash memory devices, electrical, optical or other physical/tangible (e.g. non-transitory) memory storage devices. Thus, in general, the memory 840 may comprise one or more tangible (non-transitory) computer readable storage media (e.g., a memory device) encoded with software comprising computer executable instructions. When the software, e.g., process logic 900, is executed (by the processor 820), the processor is operable to perform the operations described herein in connection with FIGS. 1-6.

There are several advantages to the techniques described herein. For example, first hop switches may play a more important role in the network by guarding control and data traffic and preventing attacks. The use of the first hop switches allows for monitoring at the network edge while providing increased visibility of suspicious activity to administrators. Furthermore, the first hop switch level security can be implemented using the generic NDP architecture.

Additionally, because the techniques create bindings using the LLA (MAC) and IPv6 addresses, the security can also operate on the OSI Network (L3) layer. For example, an end host authenticated using the LLA address will also include the IPv6 address in the local device tracking cache entry, and therefore, security can not be enforced using IP Access Control Lists.

The techniques herein also provide a basis to discover, track and dynamically grant network privileges to unmanaged devices, such as guests or printers, which cannot be authenticated by other means due to an inability to host the appropriate software.

Finally, the local device tracking cache can be extended for use in other technologies, such as fabric-based forwarding. With fabric-based forwarding, forwarding adjacency databases may be directly connected to end hosts from the first hop switch.

The above description is intended by way of example only.

What is claimed is:

1. A method comprising:
   intercepting at a first hop network node a neighbor discovery protocol (NDP) message sent from an end node to a destination in an Internet Protocol Version 6 (IPv6) network;
   comparing address information of the NDP message to values stored in a local device tracking cache at the first hop network node; and
   performing end node discovery and learning based on the comparing at the first hop network node.

2. The method of claim 1, wherein performing comprises creating a new entry in the local device tracking cache if it is determined, based on the comparing, that there is not an entry in the local device tracking cache corresponding to an address obtained from the NDP message.

3. The method of claim 2, wherein creating comprises creating a binding for a sender Link Layer Address (SLLA) and an IPv6 address of the end node.

4. The method of claim 1, wherein performing comprises inspecting the contents of the NDP message if it is determined, based on the comparing, that there is an entry in the local device tracking cache corresponding to an address obtained from the NDP message.

5. The method of claim 4, further comprising forwarding the NDP message to the destination node as a result of the inspecting.

6. The method of claim 4, further comprising performing at least one of filtering and dropping of the NDP message as a result of the inspecting.

7. The method of claim 4, further comprising obtaining from the NDP message an SLLA and a sender IPv6 address for the destination node of the NDP message.

8. The method of claim 7, wherein comparing comprises determining if a mismatch exists between the SLLA and the sender IPv6 address and values stored in the local device tracking cache, and wherein performing comprises dropping the NDP message.

9. The method of claim 1, wherein intercepting comprises intercepting at the first hop network node that is configured to operate on Layer-2 traffic.

10. The method of claim 1, further comprising performing an initial consistency check on the NDP message.

11. The method of claim 1, further comprising sending a unicast neighbor solicitation message from the first hop network node to an end node for which an entry exists in the local device tracking cache; and
   updating the local device tracking cache depending on whether a message is received from the end node in response to the neighbor solicitation message.

12. The method of claim 11, wherein updating comprises updating a state of an entry for the end node in the local device tracking cache.

13. The method of claim 11 wherein updating comprises updating the local device tracking cache in response to receiving a Neighbor Advertisement message from the end node.

14. The method of claim 11 wherein updating comprises deleting an entry in the local device tracking cache associated with the end node in the absence of a response from the end node.

15. The method of claim 14, further comprising removing network access privileges of the end node.

16. The method of claim 14, wherein sending comprises sending a plurality of unicast neighbor solicitation messages, and
   wherein updating comprised deleting an entry in the local device tracking cache in the absence of receiving a response from the end node after a predetermined number of the plurality of neighbor solicitation messages have been sent.

17. An apparatus comprising:
   at least one network interface unit;
   a memory; and
   a processor coupled to the memory and the at least on network interface unit, wherein the processor is configured to:
      intercept a neighbor discovery protocol (NDP) message sent from an end node of an Internet Protocol Version 6 (IPv6) network to a destination node;
      compare address information of the NDP message to values stored in a local device tracking cache; and
      perform end node discovery and learning based on the comparison.

18. The apparatus of claim 17, wherein the processor is configured to create a new entry in the local device tracking cache if it is determined that there is not an entry in the local device tracking cache corresponding to an address obtained from the NDP message.

19. The apparatus of claim 18, wherein the processor is configured to create a binding for a sender Link Layer Address (SLLA) and an IPv6 address of the end node.

20. The apparatus of claim 17, wherein the processor is configured to inspect the contents of the NDP message if it is determined that there is an entry in the local device tracking cache corresponding to an address obtained from the NDP message.

21. The apparatus of claim 17, wherein the processor is further configured to:
   obtain from the NDP message an SLLA and a sender IPv6 address for the destination node of the NDP message; and
   determine if a mismatch exists between the SLLA and the sender IPv6 address and values stored in the local device tracking cache.

22. The apparatus of claim 17, wherein the processor is further configured to:
   send through the at least one network interface a unicast neighbor solicitation (NS) message to an end node indicated in the local device tracking cache over the IPV6 network; and
   update the local device tracking cache.

23. The apparatus of claim 22, wherein the processor is configured to update the local device tracking cache in response to receiving a Neighbor Advertisement message from the end node.

24. The apparatus of claim 22, wherein the processor is configured to delete an entry in the local device tracking cache associated with the end node in the absence of a response from the end node.

25. A computer readable tangible storage media encoded with instructions that, when executed by a processor, cause the processor to:
   intercept a neighbor discovery protocol (NDP) message sent from an end node of an Internet Protocol Version 6 (IPv6) network to a destination node;
   compare address information of the NDP message to values stored in a local device tracking cache; and
   perform end node discovery and learning based on the comparison.

26. The computer readable tangible storage media of claim 25, wherein the instructions cause the processor to create a new entry in the local device tracking cache if it is determined that there is not an entry in the local device tracking cache corresponding to an address obtained from the NDP message.

27. The computer readable tangible storage media of claim 26, wherein the instructions cause the processor to create a binding for a sender Link Layer Address (SLLA) and an IPv6 address of the end node.

28. The computer readable tangible storage media of claim 25, wherein the instructions cause the processor to inspect the contents of the NDP message if it is determined that there is an entry in the local device tracking cache corresponding to an address obtained from the NDP message.

29. The computer readable tangible storage media of claim 25, wherein the instructions further cause the processor to:
   obtain from the NDP message an SLLA and a sender IPv6 address for the destination node of the NDP message; and
   determine if a mismatch exists between the SLLA and the sender IPv6 address and values stored in the local device tracking cache.

30. The computer readable tangible storage media of claim 25, wherein the instructions further cause the processor to:
   send a unicast neighbor solicitation (NS) message to an end node indicated in the local device tracking cache over the IPV6 network; and
   update the local device tracking cache.

31. The computer readable tangible storage media of claim 30, wherein the instructions cause the processor to update the local device tracking cache in response to receiving a Neighbor Advertisement message from the end node.

32. The computer readable tangible storage media of claim 30, wherein the instructions cause the processor to delete an entry in the local device tracking cache associated with the end node in the absence of a response from the end node.

* * * * *